United States Patent Office 2,952,641
Patented Sept. 13, 1960

2,952,641

STRONTIUM PRECIPITATION

Theodore R. McKenzie, Richland, Wash., assignor to the United States of America as represented by the United States Atomic Energy Commission No Drawing. Filed Dec. 1, 1959, Ser. No. 856,620

13 Claims. (Cl. 252—301.1)

This invention deals wtih a method of recovering strontium values from aqueous solutions, and in particular from aqueous solutions that contain strontium in very weak concentrations, such as waste solutions as they are obtained in the processing of solutions of neutron-irradiated uranium for the recovery of uranium and plutonium by solvent extraction or by precipitation.

Strontium has to be removed from such aqueous waste solutions because, on account of the long half-life of $Sr^{90}$ (28 years), the isotope usually present in the solutions just described, the radioactivity is retained for a considerable period of time and the solutions thus cannot be poured into the ground without creating a health hazard. Furthermore, $Sr^{90}$ which is a $\beta$-emitter, is a valuable material; for instance, it is used in ophthalmology as a topical remedy.

The waste solutions obtained in the processing of neutron-irradiated uranium usually are acid solutions which contain several hundreds of $\mu c./ml.$ of strontium and in addition contain iron, sulfate, nitric acid and phosphate anions; the latter mainly when the solutions of the neutron-irradiated uranium were processed by precipitation on bismuth phosphate. In drinking water $Sr^{90}$ together with that of $Y^{90}$ formed by $\beta$-decay of $Sr^{90}$ must not be present in contents higher than $8 \times 10^{-7}$ $\mu c./ml.$ according to the specifications established by the International Committee on Radiological Protection.

Strontium has been removed heretofore together with other fission products, from the aqueous "dissolver solutions" described above by incorporating a precipitate of cobalt or nickel ferrocyanide which carries strontium. This process is described in U.S. Patent No. 2,769,780 granted to Warren E. Clifford et al. on November 6, 1956. However, strontium in this patented process was not carried to a degree sufficient to allow immediate discharge of the treated supernatant solution into the ground.

It is an object of this invention to provide a process of separating strontium values from aqueous solutions by precipitation in which an improved removal of strontium is accomplished.

It is another object of this invention to provide a process for separating strontium values from aqueous solutions by precipitation which is satisfactorily operative in the presence of phosphoric acid anions.

It is also an object of this invention to provide a process for separating strontium values from aqueous solutions by precipitation in which a concentration step for the strontium solution does not have to be used.

It was found that by adding an alkaline earth metal nitrate to the aqueous solution containing phosphoric acid anions, in addition to nickel or cobalt ferrocyanide, the carrying of strontium is radically improved. For instance, by adding calcium nitrate in a quantity to yield a concentration in the solution of 0.03 M, the amount of strontium remaining in the solution was only one-fifth of that remaining in the solution when the precipitation was carried out identically but without the addition of calcium nitrate. When strontium nitrate was used as the alkaline earth metal nitrate in an amount to yield a concentration as low as 0.004 M, the amount of strontium left in the solution was cut to about one-thirtieth of the amount remaining after precipitation without alkaline earth metal nitrate.

The alkaline earth metal of the nitrate added precipitates as the phosphate which in cooperation with the nickel or cobalt ferrocyanide accomplishes a more complete scavenging action. Strontium nitrate shows the additional advantage that the waste solution does not have to be subjected to a concentration step after the precipitation, because a second step of strontium removal is not necessary. For these reasons strontium nitrate is preferred over calcium nitrate.

Experiments show that the pH value of the solution to be treated has to be at least 8 in order to obtain effective carrying on the mixture of nickel or cobalt ferrocyanide plus alkaline earth phosphate. A pH range of between 9 and 10 was preferred. Since the waste solutions for which the process of this invention is intended are usually acid, they are best neutralized, for instance, by adding ammonium hydroxide or an alkaline metal hydroxide until a pH value of above 8 is obtained.

The process of this invention thus comprises incorporating into an aqueous solution containing strontium values and phosphoric acid anions a metal ferrocyanide precipitate, said metal being selected from the group consisting of cobalt and nickel; adding an alkaline earth metal nitrate to said solution and adjusting the pH to a value of above 8; and separating the precipitate from the solution.

The concentration of the alkaline earth metal nitrate may vary widely. For instance, a concentration of from 0.004 to 0.03 M was found to be satisfactory. While for calcium nitrate the concentration of 0.03 M was best, a concentration of 0.004 M was preferred for the strontium nitrate, because at higher concentrations a further improvement in the strontium-carrying was not obtained. For the ferrocyanide a concentration of about 0.005 M was found satisfactory. The nickel or cobalt ferrocyanide is preferably formed in the solution to be treated by adding a water-soluble nickel or cobalt salt, for instance, the nitrate or the sulfate, and a water-soluble ferrocyanide, for instance, the potassium or ammonium ferrocyanide.

The concentration of phosphoric acid anions may also vary; however, a concentration of between 0.1 and 0.3 M was found to be the optimal concentration, the higher concentrations within this range yielding the very best results. If the solution was derived from processing by solvent extraction and does not contain any phosphoric acid anions, the latter are added in a quantity to furnish the above-stated concentration..

It was furthermore found that in the case of strontium nitrate a better decontamination is obtained if the strontium nitrate is added prior to the adjustment of the pH value, while the converse is true in the case of calcium nitrate.

Carrying is expedited and separation of the precipitate is facilitated if agitation and digestion are employed prior to the separation of the precipitate from the supernatant. While the precipitation may be carried out at a temperature of between 25° C. and boiling temperature of the solution, a temperature of about 90° C. is preferred.

In the following an example is given to illustrate the improvement accomplished by the process of this invention over the process used heretofore.

*Example*

Three aliquots of a strontium-containing waste solution containing phosphoric acid anions in a concentration of about 0.25 M were treated by incorporating potassium ferrocyanide and nickel sulfate and adjusting the pH to a value of above 8. In one sample of the solution precipitation was carried out without any further addition, while to the second sample calcium nitrate and to the third sample strontium nitrate was added. A number of experiments were carried out in each instance, and the results were averaged. The table below shows the operating conditions and the average values obtained for the amounts of strontium that remained in the solution.

| Operation Conditions | Average Amount of Sr Remaining in Solution, μc./ml. |
|---|---|
| $K_4Fe(CN)_6$: 0.005 M<br>$NiSO_4$: 0.005 M<br>pH: 9.0 | 1.60 |
| $K_4Fe(CN)_6$: 0.005 M<br>$NiSO_4$: 0.005 M<br>$Ca(NO_3)_2$: 0.03 M<br>pH: 9.0 | 0.295 |
| $K_4Fe(CN)_6$: 0.0025 M<br>$NiSO_4$: 0.0025 M<br>$Sr(NO_3)_2$: 0.004 M<br>pH: 10.0 | 0.056 |

These results are self-explanatory.

It will be understood that this invention is not to be limited to the details given herein, but that it may be modified within the scope of the appended claims.

This application is a continuation-in-part of application Serial No. 697,499, filed on November 19, 1957, now abandoned, in the name of Theodore R. McKenzie.

What is claimed is:

1. A process of removing strontium values from an aqueous acid solution containing said strontium values and phosphoric acid anions comprising incorporating a metal ferrocyanide precipitate into said solution, said metal being selected from the group consisting of nickel and cobalt; adding an alkaline earth metal nitrate selected from the group consisting of strontium nitrate and calcium nitrate to said solution to obtain a concentration of from 0.004 to 0.03 M and adjusting the pH value to above 8; and separating the precipitate from the solution.

2. The process of claim 1 wherein the phosphoric acid anions are present in a concentration of between 0.1 and 0.3 M.

3. The process of claim 1 wherein the pH value is adjusted to a value of between 9 and 10.

4. The process of claim 1 wherein the concentration of the metal ferrocyanide is about 0.005 M.

5. The process of claim 1 wherein the solution has a temperature of about 90° C.

6. The process of claim 2 wherein the concentration of the phosphoric acid anions is about 0.3 M.

7. The process of claim 2 wherein the alkaline earth metal nitrate is calcium nitrate.

8. The process of claim 2 wherein the alkaline earth metal nitrate is strontium nitrate.

9. The process of claim 5 wherein the metal ferrocyanide is formed in the solution by adding a water-soluble salt selected from a group consisting of nickel and cobalt salts and a water-soluble ferrocyanide.

10. The process of claim 7 wherein the calcium nitrate is added in a quantity to yield a concentration of about 0.03 M.

11. The process of claim 8 wherein the strontium nitrate is added in a quantity to yield a concentration of about 0.004 M.

12. A process of removing strontium values from an aqueous acid solution containing said strontium values and phosphoric acid anions in a concentration of from 0.1 to 0.3 M, comprising adding a water-soluble metal salt selected from the group consisting of nickel salt and cobalt salt and a water-soluble alkali ferrocyanide to said solution in quantities to yield a metal ferrocyanide concentration of 0.005 M; adding strontium nitrate in a quantity to yield a concentration of about 0.004 M; adding alkali hydroxide to the solution until a pH value of from 9 to 10 has been obtained; and separating the precipitate from the solution.

13. A process of removing strontium values from an aqueous solution containing said strontium values and phosphoric acid anions in a concentration of from 0.1 to 0.3 M, comprising adding a water-soluble metal salt selected from the group consisting of nickel salt and cobalt salt and a water-soluble alkali ferrocyanide to said solution in quantities to yield a metal ferrocyanide concentration of 0.005 M; adding alkali hydroxide to the solution until a pH value of from 9 to 10 has been obtained; adding calcium nitrate in a quantity to yield a concentration of about 0.03 M; and separating the precipitate from the solution.

References Cited in the file of this patent

UNITED STATES PATENTS 2,769,780   Clifford et al. _____ Nov. 6, 1956

OTHER REFERENCES

Langford: AEC Document HW 49,668, April 15, 1957.